UNITED STATES PATENT OFFICE.

GEORGE W. MELVILLE, OF WASHINGTON, DISTRICT OF COLUMBIA, ASSIGNOR TO W. HENRY SAYEN AND JAMES S. AUSTIN, OF PHILADELPHIA, PENNSYLVANIA.

COMPOSITION OF MATTER.

SPECIFICATION forming part of Letters Patent No. 454,489, dated June 23, 1891.

Application filed March 25, 1891. Serial No. 386,399. (No specimens.)

*To all whom it may concern:*

Be it known that I, GEORGE W. MELVILLE, a citizen of the United States, residing at Washington, in the District of Columbia, have invented a new and useful composition of matter to be used as part of a valve or for any purpose for which vulcanized rubber is used under conditions which subject it to heat, of which the following is a specification.

My composition consists of the following ingredients, combined in the proportions stated: fine Para rubber, sixty per centum; flowers of sulphur, six per centum; oxide of antimony, fourteen per centum; magnesia, twenty per centum. These ingredients are to be thoroughly ground and mingled in an ordinary mixer-mill at a heat of about 200° Fahrenheit, until they form a mass of the consistency of bread-dough. The composition is then put in a mold of the desired shape and vulcanized in the usual method for three-quarters of an hour at a heat of 290° Fahrenheit.

I am not aware that all of the ingredients of my composition in the proportions stated have ever before been used together, and I claim that the composition thus produced will resist 325° Fahrenheit, wet heat, and 150° Fahrenheit, dry heat, as well as the action of salt-water, grease, or oil, without impairing its mechanical usefulness.

What I claim, and desire to secure by Letters Patent of the United States, is—

The herein-described composition of matter to be used as part of a valve, consisting of fine Para rubber, flowers of sulphur, oxide of antimony, and magnesia, in the proportions specified.

GEO. W. MELVILLE.

Witnesses:
 DAVID SMITH,
 W. H. H. SMITH.